July 18, 1939. G. PERERA ET AL 2,166,641

MOUNTING FRAME FOR PHOTOGRAPHS AND THE LIKE

Filed Sept. 14, 1938

INVENTORS
GUIDO PERERA
BY ROBERT C. MYLES, JR.
A. M. Weller
ATTORNEY

Patented July 18, 1939

2,166,641

UNITED STATES PATENT OFFICE 2,166,641

MOUNTING FRAME FOR PHOTOGRAPHS AND THE LIKE

Guido Perera and Robert C. Myles, Jr., New York, N. Y.

Application September 14, 1938, Serial No. 229,844

5 Claims. (Cl. 40—158)

The present invention relates to mounting frames, and, more particularly, to transparent mounting frames for mounting photographs and similar articles on sheets, boards, albums, and the like.

As those skilled in the art know, conventional mounting frames had various serious disadvantages. Thus, conventional mounting frames for photographs and similar articles were relatively bulky and expensive. Therefore, it was not possible to employ them where a great number of photographs was to be preserved such as is the case, for example, in albums for snapshots, and the like. As a matter of fact, in most cases photograph albums were merely provided with individual sheets or pages of cardboard having strips, slots, or bands integrally formed with or connected to the pages and adapted to retain the corners of the prints or snapshots. Of course, this arrangement was very crude and unsatisfactory in that it did not provide any protection for the upper surfaces of the pictures which were exposed to injury and to the detrimental effects of moisture and dust. Moreover, pictures would slide out of the retaining elements and would get lost. It has already been suggested to provide individual mounting frames on the pages of an album for individually retaining the pictures under a protective and transparent cover. However, these conventional mounting frames were relatively complicated and bulky so that only a few pages of the described character could be connected to each other to form an album without unduly increasing the thickness thereof. Similarly these prior mounting frames could not accommodate articles of any thickness, such as coins, samples such as fabrics, cloth, etc., butterflies and the like. Although various other suggestions and proposals have been made to solve the outstanding problem and to provide the art with a completely satisfactory mounting frame for photographs and similar pictorial representations, none, as far as we are aware, of these various suggestions and proposals was completely satisfactory and successful when carried into practice on a practical and commercial scale.

We have discovered a simple and completely satisfactory solution of the outstanding problem.

It is an object of the present invention to provide a mounting frame for photographs, pictures and the like, which is free from the disadvantages of conventional mounting devices and methods.

It is another object of the present invention to provide a novel and improved mounting frame for mounting photographs and similar articles on a flat surface, such as a sheet, plate, in an album, and the like, which is capable of securely holding the mounted pictorial article in a fixed position in which it is fully exposed to view but is at the same time fully protected from dust, dirt, moisture and other detrimental agencies.

It is a further object of the invention to provide an improved mounting frame for mounting photographs and the like, involving a flat frame constituted of a sheet-like member having a transparent covering element attached thereto underneath which the picture or photograph may be placed so that both the insertion and the removal of the article can be effected at a moment's notice and without the application and the removal of a cementitious agent.

The invention also contemplates a novel and improved mounting frame constituted of a thin, sheet-like material having its back face gummed for easy attachment to any plane surface and having a transparent cover plate of a flexible character attached to only one edge of said frame whereby the insertion and the removal of a photograph into and from the frame is greatly facilitated.

A still further object of the invention is a mounting frame constituted of a flexible, sheeetlike material having a transparent cover plate cemented thereto at one edge thereof, which has a minimum of thickness and of which a large number may be mounted on a plurality of sheets or cards, to form an album of relatively reduced thickness.

It is likewise within the contemplation of the invention to provide a novel and improved mounting frame for photographs and pictures which is extremely simple in construction, and which may be manufactured and sold at a low price.

Other and further objects and advantages of the present invention will become apparent from the following description taken in conjunction with the accompanying drawing, in which.

Broadly stated, according to the principles of our invention, we provide a frame member constituted of a sheet-like material such as, for example, paper, cardboard, or a suitable impregnated textile material having strength and at least some flexibility. Preferably, this frame member is formed to have a substantially quadrangular character and is provided with a quadrangular opening or window. Underneath this opening or window, we provide a transparent covering member or cover plate constituted of a transparent, sheet-like material, such as Celluloid, Cellophane, or some other transparent film of a flexible character having a size slightly larger than the opening or window provided in the frame member. We prefer to cement only one of the edges of this cover plate to the bottom surface of the frame member while the other three edges of the cover plate remain free for slight lateral displacement with respect to the window in the frame member. The transparent covering material of Celluloid, Cellophane and the like is given additional freedom by providing a raised inner edge adjacent to the window in the frame. At the inner edge of the frame member opposite to the one to which the cover plate is cemented, we provide a pair of short incisions forming extensions of the two adjoining inner side edges of the frame. The free edge of the cover plate opposite to the edge attached to the frame portion is passed through the incisions in the frame portion and rests above the frame portion forming a part through which a photograph or similar article may be inserted underneath the cover plate or may be removed. Suitable tongue-like extensions are provided in the free edge of the cover plate and extend underneath the frame member to form an interlocking structure therewith and to retain the cover plate in position. The tongue-like extensions will permit slight displacements of the cover plate with respect to the frame member so that the insertion and the removal of a picture into the mounting frame may be carried out with facility. We prefer to coat the bottom surface of the frame member with a suitable adhesive whereby the complete mounting frame structure can be readily attached to any desired base of a flexible or rigid character.

The invention will now be more fully described to those skilled in the art in conjunction with the accompanying drawing.

Figure 1:
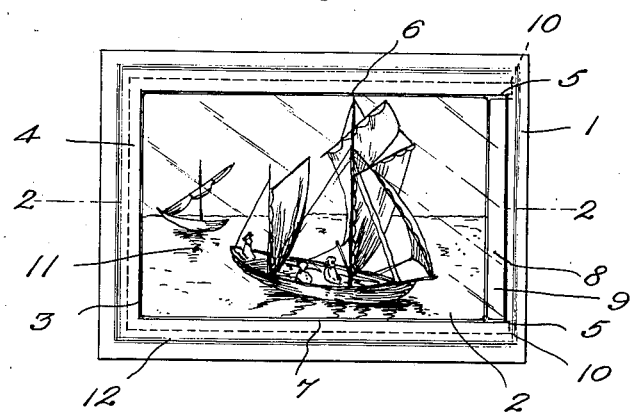
Fig. 1 illustrates a front elevational view of a preferred embodiment of the present invention.
Figure 2:
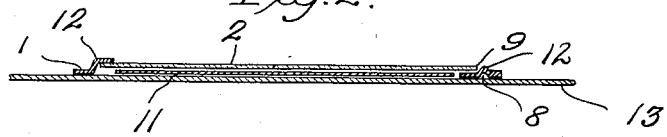
Fig. 2 depicts a vertical sectional view taken on line 2—2 of Fig. 1.
Figure 3:
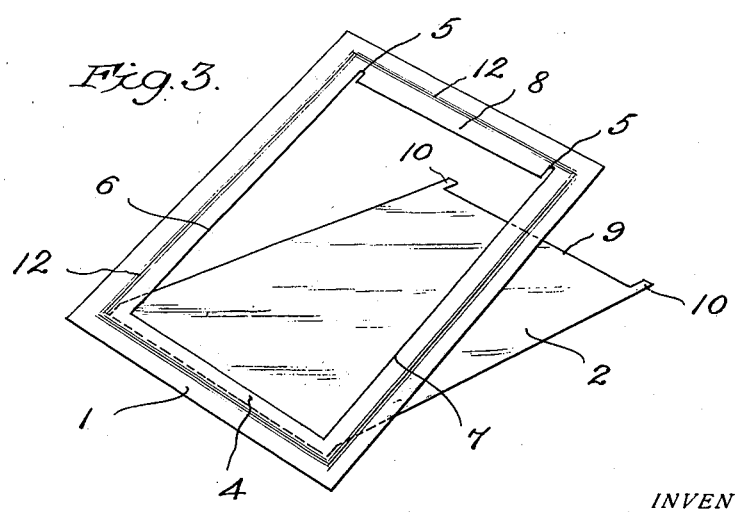
Fig. 3 shows a perspective view of the mounting frame illustrated in Figs. 1 and 2 during an intermediate step of its assemblage.

Referring more particularly to the drawing, a preferrd embodiment of the invention is illustrated. Essentially, a frame member 1 constituted of a suitable sheet-like material is provided having a quadrangular shape and having a window or opening 3 therein. Although in the drawing a quadrangular-shaped frame is shown, of course, various other shapes may be used with the same or similar results. The bottom surface of the frame member is coated with a suitable cementitious or bonding agent whereby it can be easily cemented or glued to a base 13 of any description. Underneath frame member 1 is provided a cover plate 2 of a transparent and flexible character having slightly greater dimensions than the opening or window 3 in the frame member. As it will be best observed from Fig. 3 illustrating the mounting frame of the invention during its assemblage, only the left hand edge 4 of cover plate 2 is cemented or bonded to the bottom surface of the marginal portion of frame member 1, while three sides of the cover plate are free and uncemented and are capable of slight relative displacement with respect to the frame member. The inner edge of frame member 1 opposite to the edge to which the transparent cover plate is attached, is provided with two short incisions 5 forming extensions of the inner lateral edges 6 and 7 of the frame member. These incisions provide a partially detached extension 8 for the frame member. Cover plate 2 is also provided with extensions or tongues 10 at the edge opposite to the attached side thereof. During the assemblage of the mounting frame, the free edge of cover plate 2 carried through incisions or slits 5 is snapped over extension 8 of the frame member and is placed above the same. In this position of cover plate 2, tongues 10 thereof are resting underneath the portions of the frame member adjoining slits 5 and securely lock the free edge of the cover plate. Due to this locking effect, after the frame is secured to a mounting sheet or base, the free edge of the transparent cover plate of Celluloid, Cellophane, or the like, cannot be removed. However, locking tongues 10 allow sufficient freedom of movement of the free edge of cover plate 2 to insert a photograph 11 or a similar article underneath the cover plate and to allow the insertion of articles of appreciable thickness into the completely assembled frame after it has been secured to a mounting sheet. Frame member 1 is also provided with a slightly embossed line 12 in order to further enhance the attractive appearance of the complete structure and to reduce the thickness thereof. The embossed line provides a raised marginal recess which affords a marginal seat for the transparent cover plate of Celluloid, Cellophane, or the like.

From the foregoing description, the operation of the mounting frame of the invention will be readily understood by those skilled in the art. The mounting frame is cemented to a suitable base, such as an album leaf, or the like. When it is desired to insert a picture or some similar article into the frame, the picture is slipped underneath the free edge 9 of cover plate 2 and is adjusted to its proper position, for example, by means of a pair of tweezers. This is readily accomplished due to the fact that the transparent cover plate is capable of slight displacement with respect to the frame as a result of the yielding and resilient locking action of tongues 10. Likewise, the picture or other article can be easily removed from the mounting frame by introducing underneath the cover plate the ends of a pair of tweezers and gripping the marginal portions of the picture.

It will be noted that the mounting frame embodying the present invention provides a number of important advantages. Thus, first of all, the mounting frame of the invention is extremely simple in its construction and has but very little thickness so that a large number of them may be provided on the pages of an album without unduly increasing the thickness of the album. The size of the mounting frames is, of course, adjusted to the size of the articles to be preserved in the album to form a collection of various articles such as, snapshots, newspaper clippings, autographs, paper money, coins, butterflies, book match covers, and the like.

It is also to be observed that the backless mounting frame embodying the invention may be attached to surfaces of the most varying description such as, for example, mirrors, windows, cabinets, walls, drawers, cards, files, folders, bulletin boards, luggage, parcel post packages, windshields and also to sticks or stakes employed for marking the price or the name of articles. The mounting frame of the invention may be also used for decorative purposes on lamps, screens, match boxes, cigarette boxes, and the like. Due to the slightly displaceable character of the cover plate in the frame member and to the elasticity of the cover plate, an article can be readily inserted into the mounting frame and may be readily adjusted therein without bending or catching, even when the frame member is connected to a completely rigid surface. At the same time, the shoulders of the cover plate prevent its slipping out from the portion of the frame defined by the embossed line even though considerable pressure is exerted thereon.

Moreover, the mounting frame of the invention is not only very attractive in character but is constituted of very inexpensive and simple parts so that it may be manufactured on a practical and industrial scale at a very low cost.

Although the present invention has been described in connection with a preferred embodiment thereof, variations and modifications may be resorted to by those skilled in the art without departing from the principles of the present invention. We consider all of these variations and modifications as within the true spirit and scope of the present invention as disclosed in the present description and defined by the appended claims.

We claim:

1. A backless mounting frame for photographs and the like which comprises in combination a frame member having an opening therein, a pair of short incisions in said frame member forming extensions of two inner lateral edges thereof, and a transparent and flexible cover plate having larger dimensions than said opening underneath said frame member, said cover plate having one of its ends secured to the bottom surface of said frame member and having its opposite end extending through said incisions above said frame member forming a port for the introduction of a photograph underneath said cover plate.

2. A backless mounting frame for photographs and the like which comprises in combination a frame member constituted of a flexible sheet-like material having an opening therein, a pair of short incisions in said frame member forming extensions of two inner lateral edges thereof, a transparent and flexible cover plate underneath said frame member and covering said opening therein, said cover plate having one of its ends secured to the bottom surface of said frame member and having its free opposite end extending through said incisions above said frame member and forming a port for the introduction of a photograph underneath said cover plate, and shoulders integrally formed with the free end of said cover plate for displaceably locking said cover plate to said frame member.

3. A backless mounting frame for photographs and the like which comprises in combination a frame member constituted of a flexible sheet-like material having an opening therein, a pair of short incisions in said frame member forming extensions of two lateral edges of said opening, a transparent and flexible cover plate underneath said frame member and covering said opening, said cover plate having one of its edges secured to the bottom surface of said frame member and having its free opposite end extending through said incisions above said frame member and forming a port for the introduction of a photograph underneath said cover plate, shoulders extending from the corners of the free end of said cover plate beyond said incisions for locking said cover plate to said frame member without interfering with slight displacements and resilient deformation of said cover plate during introduction and removal of an article through said port, and a layer of cementitious agent on the bottom face of said frame member for cementing said mounting frame to a supporting surface.

4. A backless mounting frame for photographs and the like which comprises in combination a frame member constituted of a flexible sheet-like material having a window therein, a pair of short incisions in said frame member forming a partially detached tongue-like extension therein, a transparent and flexible cover plate underneath said frame and covering said window, said cover plate having one of its edges secured to the bottom surface of said frame member and having its free opposite edge extending through said incisions above said tongue-like extension and forming a port for the introduction of a photograph underneath said cover plate, shoulders extending from the corners of the free end of said cover plate beyond said incisions for locking said cover plate to said frame member without interfering with slight displacements and resilient deformation of said cover plate during introduction and removal of an article through said port, and a layer of a bonding agent on the bottom face of said frame member for cementing said mounting frame to a supporting surface.

5. A backless mounting frame for photographs and the like which comprises in combination a frame member constituted of a flexible sheet-like material having a window therein, a pair of short incisions in said frame member forming a partially detached tongue-like extension therein, an embossed line in said frame member spacedly surrounding said window, a transparent and flexible cover plate underneath said frame member and covering said window, said cover plate having one of its edges secured to the bottom surface of said frame member and having its free opposite end extending through said incisions above said tongue-like extensions and forming a port for the introduction of a photograph underneath said cover plate, shoulders extending from the corners of the free end of said cover plate beyond said incisions for locking said cover plate to said frame member without interfering with slight displacements and resilient deformation of said cover plate during introduction and removal of a photograph through said port, and a layer of a bonding agent on the bottom face of said frame member for cementing said mounting frame to a supporting surface.

GUIDO PERERA.
ROBERT C. MYLES, Jr.